(12) United States Patent
Shahid

(10) Patent No.: US 6,352,372 B1
(45) Date of Patent: Mar. 5, 2002

(54) HIGH-DENSITY OPTICAL CONNECTORS

(75) Inventor: Muhammed Afzal Shahid, Snellville, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/416,185

(22) Filed: Oct. 11, 1999

(51) Int. Cl.[7] .............................. G02B 6/38; G02B 6/40
(52) U.S. Cl. .......................... 385/59; 385/63; 385/65; 385/136; 385/137
(58) Field of Search ........................... 385/59, 63, 65, 385/83, 115, 116, 136, 137

(56) References Cited

U.S. PATENT DOCUMENTS

| | | |
|---|---|---|
| 3,864,018 A | 2/1975 | Miller |
| 4,078,853 A | 3/1978 | Kempf et al. |
| 4,973,127 A | 11/1990 | Cannon, Jr. et al. |
| 5,044,711 A * | 9/1991 | Saito ........................ 385/137 |
| 5,155,785 A | 10/1992 | Holland et al. |
| 5,214,730 A | 5/1993 | Nagasawa et al. |
| 5,287,426 A | 2/1994 | Shahid |
| 5,315,678 A * | 5/1994 | Maekawa et al. ............. 385/59 |
| 5,325,451 A * | 6/1994 | Hartman et al. ............. 385/49 |
| 5,379,361 A * | 1/1995 | Maekawa et al. ............. 385/59 |
| 5,388,174 A | 2/1995 | Roll et al. |
| 5,603,870 A | 2/1997 | Roll et al. |
| 5,613,024 A | 3/1997 | Shahid |
| 5,620,634 A | 4/1997 | Shahid |
| 5,689,599 A | 11/1997 | Shahid |

OTHER PUBLICATIONS

Lightwave, Multifiber–ferrule ribbon cable connector shrinks installation costs, Reprinted from Oct. 1996 of Lightwave, 5 pages.

* cited by examiner

Primary Examiner—Jon Henry

(57) ABSTRACT

A receptacle-like or plug-like optical connector has a body with a rear end and an end face that is opposite from and forward of the rear end. A longitudinal direction is defined between the rear end and the end face, and the end face extends generally perpendicular to the longitudinal direction. The end face has opposite first and second edges, and opposite third and fourth edges that extend between the first and second edges in a lateral direction. A plurality of arrays of optical terminuses are positioned at the end face and, and each array extends in the lateral direction across the end face. The optical connector includes one or more relatively large alignment members. A first alignment member is proximate to the third edge of the end face and extends in the longitudinal direction and a second alignment member is proximate to the fourth edge of the end face and extends in the longitudinal direction. The body of the optical connector can be a stack of multi-fiber connectors, and the optical connector can further include optical fiber ribbons that are respectively held by the connectors.

37 Claims, 6 Drawing Sheets

HIGH-DENSITY OPTICAL CONNECTORS

FIELD OF THE INVENTION

The present invention generally relates to high-density optical connectors and, more particularly, to high-density optical connectors formed from stackable multi-fiber connectors.

BACKGROUND OF THE INVENTION

Advances in lightwave technology have made optical fiber a very popular medium for large bandwidth applications. In particular, optical technology is being utilized more and more in broadband systems wherein communications between systems take place on high-speed optical channels. As this trend continues to gain more and more momentum, the need for efficient utilization of the precious real estate on circuit boards, racks/shelves, back planes, distribution cabinets, etc., is becoming ever increasingly important. In order to fulfill expectations across the industry, opto-electronic modules and optic fiber devices need to continue to become miniaturized, thereby taking full advantage of the maturity of micro- and opto-electronic technologies for generating, transporting, managing and delivering broadband services to the ever increasing bandwidth demands of end users at increasingly lower costs. Thus, the industry has placed an emphasis on small form factor optical connectors, such as the LC connector from Lucent Technologies, Inc. However, miniaturization is tempered by the requirements of transmission efficiency. For instance, with the advent of new standards such as gigabit Ethernet, wherein the transmission efficiency is becoming more and more critical, the performance of optical connectors is becoming correspondingly important for healthy operation of the system. Thus, it is desirable to obtain component miniaturization without sacrificing transmission efficiency, and preferably while improving transmission efficiency.

With the miniaturization of optical modules and optical fiber devices, the management of optical fiber congestion has become an issue at optical interfaces and connection distribution points. One solution is the use of optical fiber ribbon in which a plurality of optical fibers are organized and molded side by side in a plastic ribbon. It is known to interconnect optical fiber ribbons by supporting the optical fibers thereof between two support members made of a monocrystalline material, such as silicon. In the support members are V-grooves formed utilizing photolithographic masking and etching techniques. The optical fibers are placed side by side in individual V-grooves of one support member and the other mating support member having corresponding V-grooves is placed over the fibers to bind or hold the fibers in a high precision, spatial relationship between the mating V-grooves. The top and bottom support members sandwiching the optical fiber ribbon are typically bonded together with a clamp or adhesive, forming a connector. Two connectors with the same optical fiber spacing may then be placed in an abutting relationship so that the ends of the optical fibers of the respective connectors are substantially co-axially aligned with one another, thereby forming a multi-fiber connection. If desired, such connectors can be stacked in order to increase the interconnection density.

Optical fiber ribbons and connectors have numerous applications in optic communication systems. For instance, some opto-electronic and optical application specific integrated circuits (OASIC) devices, such as optical switches, optical power splitters/combiners, and routers, have several input and/or output ports arranged as linear arrays to which a plurality of fibers are to be coupled. Since optical fibers are attached to launch optical signals into these devices and extract optical signals out of these devices, splicing of arrays of fibers to such devices can be achieved using mutifiber connectors. Yet another possible application relates to an optical fan-out fabric where an array of fibers in an optical fiber ribbon may be broken into simplex or duplex channels for distribution purposes, as is often desired.

A critical factor to the optical efficiency of a multi-fiber connection is the precise alignment of the mating connectors with regard to one another. It is conventional for alignment between a pair of mated connectors to be facilitated by a pair of alignment members that are in the form of pins attached to one of the connectors that are received into a pair of holes defined by the other connector. As connectors are stacked to increase interconnection density, it is conventional for each pair of mated connectors in the stack to have associated therewith a pair of alignment pins that are received into a pair of alignment holes. The sum of all the space occupied by all of the alignment pins and alignment holes in such a stack is not available for accommodating optical fibers. Therefore, the redundancy of alignment pins and alignment holes in stacks of connectors is an impediment to maximizing interconnection density.

U.S. Pat. No. 3,864,010 discloses an optical fiber butt joint connector that includes two identical butt joint connections that are aligned by reverse ridge fixtures. More specifically, each butt joint connection includes multiple chips. Each chip includes a series of spaced parallel longitudinal grooves on its top and bottom surface. Each of those grooves is identically sized. Exposed ends of optical fibers are respectively placed in the top grooves of a bottom chip, and thereafter the bottom grooves of a second chip are respectively mated over the top grooves of the bottom chip. This process is repeated to form a butt joint connection in the form of a stack of chips in which the top grooves of the top chip and the bottom grooves of the bottom chip are not occupied. Two such butt joint connections are joined end-to-end, and the necessary alignment is achieved by ridge fixtures having ridges that correspond in shape and size to, and that are respectively received by, the grooves at the tops and bottoms of the joined butt joint connectors. Because those grooves at the tops and bottoms of the joined butt joint connectors are relatively small due to their being designed to optimally receive and hold optical fibers, they can be characterized as being more difficult to use and manufacture, and less strong, than larger alignment grooves. For example, with the uniform arrangement of relatively small grooves at the tops and bottoms of the butt joint connectors and the corresponding relatively small ridges of the ridge fixtures, it is possible that the ridges and grooves will be misaligned, resulting in disadvantageous misregistration of the ends of the optical fibers. Ease of use and manufacture, and strength, are important considerations as high-density optical connectors become more widely used and are used in applications that require optical connectors to be repeatedly connected and disconnected.

SUMMARY OF THE INVENTION

The present invention solves the above problems, and other problems, by providing new high-density optical connectors. In accordance with one aspect of the present invention, an optical connector includes at least one alignment member at the top or the bottom side thereof, without having alignment members along the sides thereof. The optical connector includes multiple arrays of optical terminuses, such as terminuses of optical fibers, that extend laterally between the sides. As a result, the number of optical terminuses included in the arrays can be advantageously maximized. The alignment member(s) are relatively large so that they are relatively strong, and relatively easy to manufacture and use.

More specifically, in accordance with one aspect of the present invention, the optical connector has a body with a rear end and an optical end face that is opposite from the rear end. A longitudinal direction is defined between the rear end and the optical end face, and the optical end face extends generally perpendicular to the longitudinal direction. The optical end face has opposite first and second edges, and opposite third and fourth edges that extend between the first and second edges in a lateral direction. Multiple arrays of optical terminuses, such as, but not limited to, terminuses of optical fibers, are positioned at the optical end face, and each array extends in the lateral direction across the optical end face. The optical connector includes one or more relatively large alignment members, and in one example a first alignment member is proximate to the third edge of the optical end face and extends in the longitudinal direction, and a second alignment member is proximate to the fourth edge of the optical end face and extends in the longitudinal direction. Alignment members facilitate aligned mating between optical connectors.

In accordance with one aspect of the present invention, the optical connector is a stack of multi-fiber connectors in combination with optical fiber ribbons that are respectively held by the multi-fiber connectors. Each optical fiber ribbon includes longitudinally extending optical fibers bonded together as a unit, and for each array the optical terminuses thereof are terminuses of the optical fibers of a respective optical fiber ribbon. The stack of multi-fiber connectors includes a pair of outer support members and one or more inner support members. Each outer support member includes opposite outer and inner sides. The inner side of each outer support member defines an array of parallel grooves for receiving some of the optical fibers, and the outer side of each outer support member defines an alignment member for facilitating aligned mating between optical connectors. Each inner support member includes opposite sides, each of which defines an array of parallel grooves for receiving some of the optical fibers. The alignment members are relatively large compared to the diameter of the optical fibers and the grooves for receiving optical fibers.

In accordance with one aspect of the present invention, the optical connector is a plug-like optical connector. More specifically, the alignment member(s) are in the form of relatively large, longitudinally extending alignment groove (s) that extend rearward from the optical end face.

In accordance with another aspect of the present invention, the optical connector is a receptacle-like optical connector. More specifically, the alignment member(s) are in the form of relatively large longitudinally extending alignment ridge(s) that extend forward from the optical end face. Even more specifically, a cavity is defined by interior sides that extend forward from the optical end face. The cavity is for receiving a plug-like optical connector, and the alignment ridge(s) extend into the cavity.

In accordance with another aspect of the present invention, in each array of optical terminuses, a distance is defined between adjacent optical terminuses that is less than a distance defined between adjacent arrays. In accordance with yet another aspect, the distance defined between the adjacent alignment members of an optical connector is greater than the distance defined between adjacent optical terminuses of that optical connector.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In one application, the present invention is directed to small form factor optical connectors, such as LC connectors, that have particularly advantageous applications in high-density interconnection systems. The relatively small footprint of the connectors of the present invention is relatively easy to fabricate and assemble, and is more space efficient than prior connector designs. The connectors of the present invention can include a wide variety of different optical terminuses, including, but not limited to, optical transmitters, optical receivers, and terminuses of optical fibers. Nonetheless, the specific examples of the present invention that are illustrated in the accompanying drawings are directed to stacks of multi-fiber connectors that are designed for terminating optical fiber ribbons. Accordingly, the following disclosure initially describes a connector of the present invention generally, and thereafter describes the connector more specifically in the form of a stack of multi-fiber connectors. The broad concepts of the present invention are not limited to stacks of multi-fiber connectors.

Figure 1:
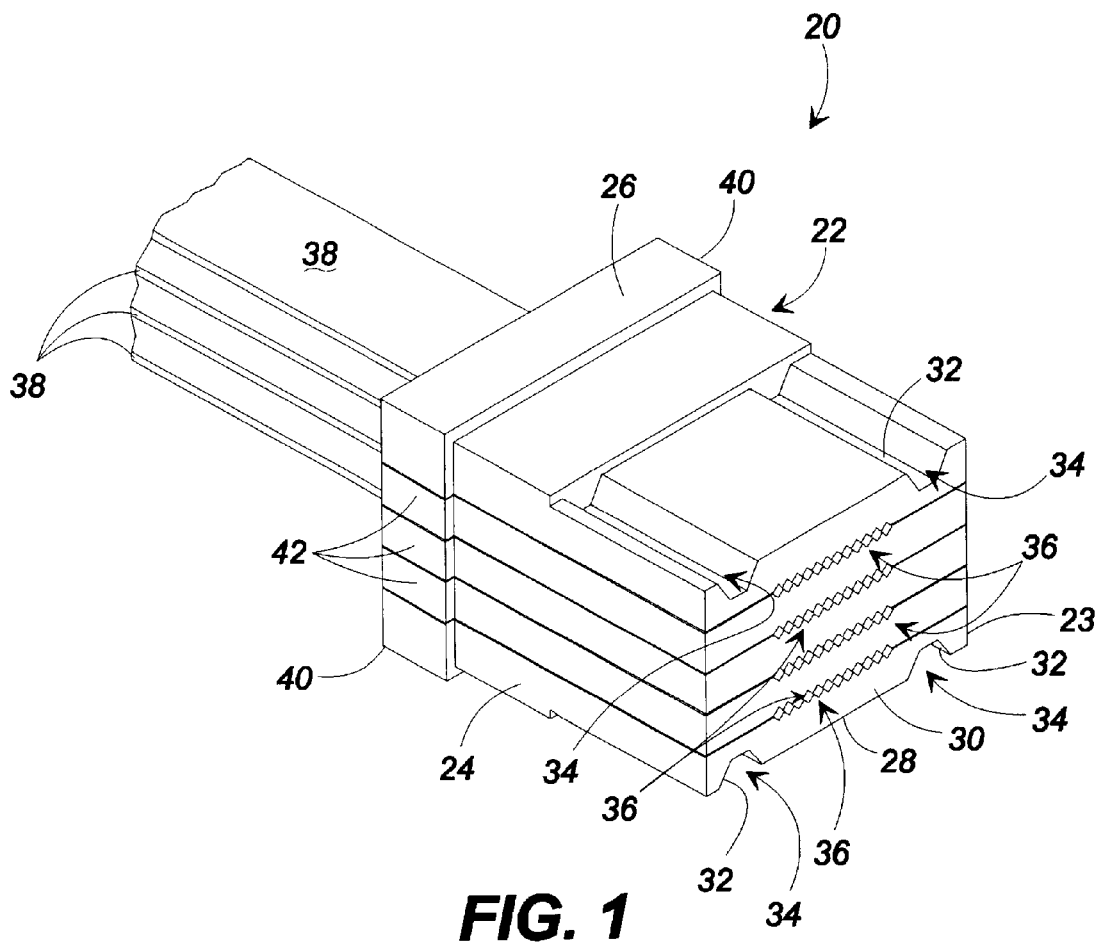
FIG. 1 is a perspective view of a plug-like optical connector, which is in the form of a stack of multi-fiber connectors terminating several optical fiber ribbons, in accordance with a first embodiment of the present invention.

FIG. 1 illustrates an optical assembly 20 that includes a plug-like optical connector 22, in accordance with a first embodiment of the present invention. As illustrated, the optical connector 22 includes opposite right and left sides 23, 24 that extend vertically and in a longitudinal direction. The optical connector 22 further includes opposite top and bottom sides 26, 28 that extend in the longitudinal direction and horizontally between the right and left sides 23, 24. An optical end face 30 extends generally perpendicular to the longitudinal direction and between forward edges of the right, left, top, and bottom sides 23, 24, 26, 28. More specifically, the optical end face 30 includes right, left, top, and bottom edges that are respectively contiguous with the forward edges of the right, left, top, and bottom sides 23, 24, 26, 28.

Throughout this Detailed Description of the Invention section of this disclosure, items are described in the context of specific orientations, such as horizontal and vertical orientations. Those orientations are intended to provide a frame of reference to aid in the explanation of the present invention. The present invention can be described in the context of other orientations and is not limited to any specific orientation.

In accordance with the first embodiment of the present invention, the optical connector 22 includes a pair of upper alignment members and a pair of lower alignment members that are operative, as will be discussed in greater detail below, for aligning the optical end face 30 of the optical connector with an optical end face of another optical connector. It is within the scope of the present invention for alignment members to be dowels or pins, or the like, associated with a first connector, and correspondingly shaped voids, or the like, associated with a second connector that is for mating with the first connector. More specifically, in accordance with the first embodiment, the pair of upper alignment members includes a pair of alignment surfaces 32 that are located at the top side 26 of the optical connector 22 and define a pair of alignment grooves 34 that extend in the longitudinal direction at the top side of the optical connector. Likewise, the pair of lower alignment members includes a pair of alignment surfaces 32 that are located at the bottom side 28 of the optical connector 22 and define a pair of alignment grooves 34 that extend in the longitudinal direction at the bottom side of the optical connector. In accordance with the first embodiment, the alignment grooves 34 at the top side 26 are open at the optical end face 30 as well as along the top side. Similarly, the alignment grooves 34 at the bottom side 28 are open at the optical end face 30 as well as along the bottom side. In accordance with the first embodiment, the alignment grooves 34 are in the form of truncated V-shapes.

In accordance with the illustrated version of the first embodiment, four separate arrays 36 of optical terminuses extend horizontally along the optical end face 30. It is within the scope of the present invention for the optical terminuses of the arrays 36 to be a variety of different types of optical devices. Examples of optical terminuses that are within the scope of the present invention include, but are not limited to, terminuses of optical fibers, optical transmitters, and optical receivers. Optical transmitters can be light emitting diodes, VCSELs, or the like. Optical receivers can be photoelectric cells, or the like. In accordance with the first embodiment, in each array 36 a distance is defined between adjacent optical terminuses, and that distance is less than the distance defined between adjacent arrays.

In accordance with the illustrated version of the first embodiment, the optical connector 22 is a stack of multi-fiber connectors and the optical terminuses of the arrays 36 are the terminuses of optical fibers of four optical fiber ribbons 38. Acceptable examples of optical fiber ribbons 38 are described in U.S. Pat. No. 4,900,126, which is incorporated herein by reference. More specifically, each optical fiber ribbon 38 extends longitudinally and includes a lateral array of conventional coated optical fibers that transmit light. Each optical fiber ribbon 38 further includes a solidified bonding material that fills the interstices between the optical fibers, binds together the optical fibers, and extends to the outside boundary of the optical fiber ribbon.

As illustrated in FIG. 1, the optical connector 22 includes two identical outer support members 40 that sandwich three identical inner support members 42. For illustrative purposes, the embodiment chosen terminates four optical fiber ribbons 38. Whereas each optical fiber ribbon 38 is illustrated as including twelve optical fibers, it will be apparent to one of ordinary skill in the art that the disclosed connector design may be utilized to terminate any number of optical fiber ribbons 38 and/or any number of optical fibers per optical fiber ribbon.

As will be discussed in greater detail below, the support members 40, 42 include parallel V-grooves that hold the optical fibers of the respective optical fiber ribbons 38 in precise, spaced alignment with respect to one another as the V-grooves of adjacent support members are laid over one another in a mating relationship. The terminuses of the individual optical fibers of the optical fiber ribbons 38 are substantially flush to the optical end face 30 of the optical connector 22 so that the optical fibers may be optically coupled to another connector or device, such as optical transmitter and receiver modules.

Figure 2:
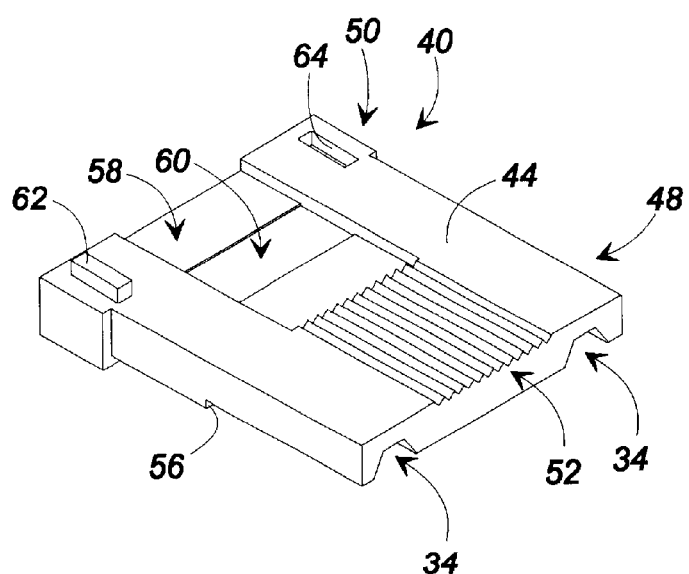
FIG. 2 is an isolated perspective view of an inside surface of an outer support member of the stack of multi-fiber connectors of FIG. 1.
Figure 3A:
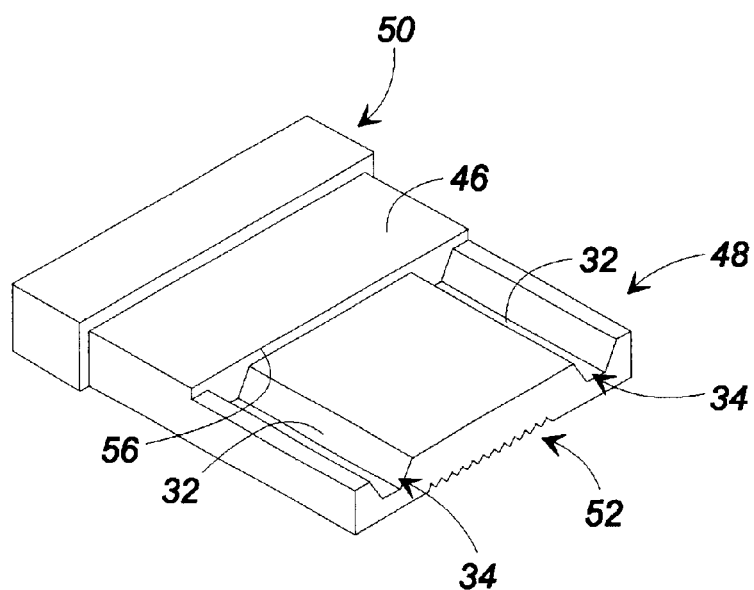
FIG. 3A is an isolated perspective view of an outside surface of the outer support member of FIG. 2.

With reference to FIGS. 2 and 3A, an inside surface 44 and an outside surface 46 of a representative outer support member 40 are illustrated, respectively, in accordance with the first embodiment. The outer support member 40 includes a front portion 48 and a rear portion 50. As best seen in FIG. 2, an array of parallel V-grooves 52 for receiving and holding the optical fibers of an optical fiber ribbon 38 (FIG. 1) in precise alignment with respect to one another are provided in the front portion 48 of the inside surface 44. Whereas twelve V-grooves 52 are provided by the outer support member 40, it will be appreciated by those of ordinary skill in the art that more or fewer than twelve may be utilized, though the maximum number may be limited by the physical size of the connector footprint.

As best seen in FIG. 3A, the outside surface 46 includes a pair of the relatively large alignment grooves 34 (also see FIG. 1), which are laterally displaced from one another and are sized and shaped for holding alignment ridges, which are discussed in detail below. Whereas the alignment grooves 34 extend from the front portion 48 toward the rear portion 50 and terminate at a shoulder 56, the alignment grooves can be sized to extend from the front portion 48 to the rear portion 50, essentially extending from the front edge to the opposite rear edge of the outside surface 46.

Figure 3B:
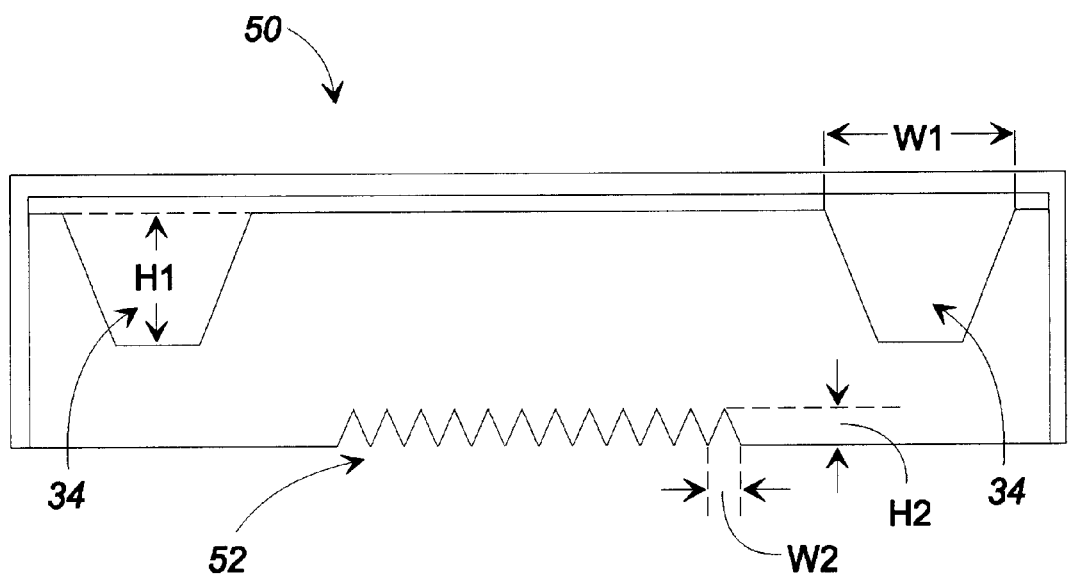
FIG. 3B is an isolated end elevation view of the outer support member of FIG. 2.

As best seen in FIG. 3B, in accordance with the first embodiment, the alignment grooves 34 are substantially larger than the individual grooves of the array of parallel V-grooves 52. More specifically, each of the alignment grooves 34 has a width "W1" and a height "H1" that are respectively at least twice as large as a corresponding width "W2" and height "H2" of each of the individual grooves of the array of parallel V-grooves 52. In accordance with the first embodiment, each of the alignment grooves 34 has a width W1 of approximately 850 microns and a height H1 of approximately 375 to 400 microns, and each of the individual grooves of the array of parallel V-grooves 52 has a width W2 of approximately 150 microns and a height H1 of approximately 80 to 90 microns. In addition, the alignment grooves are substantially larger than the diameter of the optical fibers received by the V-grooves 52. In accordance with the first embodiment, each of the optical fibers includes a glass center that is surrounded by a coating, and the outer diameter of the coating is approximately 250 microns. For each of the optical fibers, the coating is stripped from the glass center and solely the glass center is placed in the respective V-groove 52. Each glass center has a diameter of approximately 125 microns. The alignment grooves 34 are relatively large so that they are relatively strong, and relatively easy to manufacture and use. In addition, adjacent alignment grooves 34 are further apart than adjacent grooves of the array of parallel V-grooves 52, which further promotes ease of use.

As best seen in FIG. 2, the rear portion 50 includes a ribbon recess 58 that holds an optical fiber ribbon 38 (FIG. 1) at approximately the point at which the individual optical fibers of the ribbon are separated and stripped. The ribbon recess 58 also provides space for the adhesive utilized to bond adjacent support members together, as discussed below. Further, the ribbon recess 58 includes a strain relief element recess 60 for receiving and engaging a lip or other retaining structure at the end of an external strain relief element (not shown) associated with the optical fiber ribbon 38.

As best seen in FIG. 2, a retaining pin 62 and a retaining slot 64 are provided on either side of the ribbon recess 58 for aligning and holding adjacent support members. The retaining pin 62 and slot 64 provide for the lateral alignment of adjacent support members so that corresponding arrays of V-grooves align with one another. The mating V-grooves can be fabricated with such precision, as discussed hereinafter, that the V-grooves themselves precisely align the individual optical fibers. This is inherent in the V-shaped design which has an acceptance region for receiving an individual optical fiber that is held in a precise predetermined alignment by the sides of the V-groove. The precise alignment of adjacent support members ensures that the mating V-grooves of adjacent support members are in registration with one another.

Figure 4:
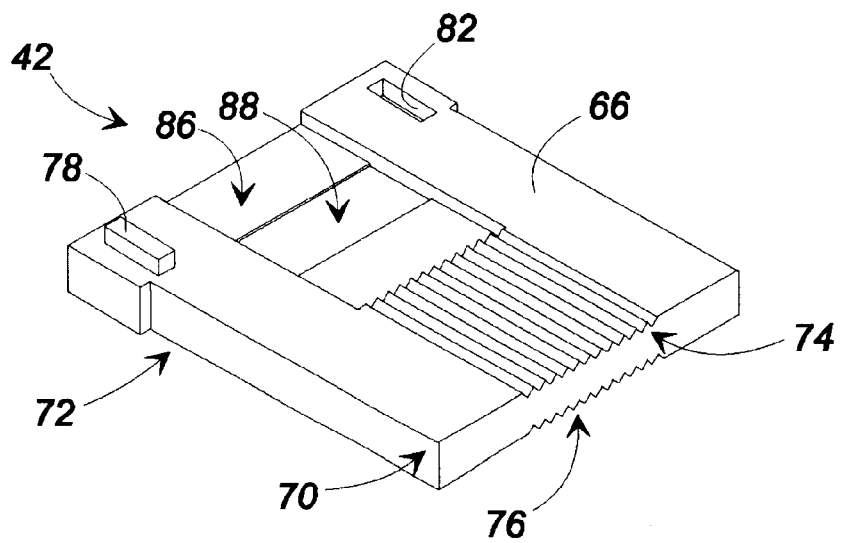
FIG. 4 is an isolated perspective view of a first surface of an inner support member of the stack of multi-fiber connectors of FIG. 1.
Figure 5:
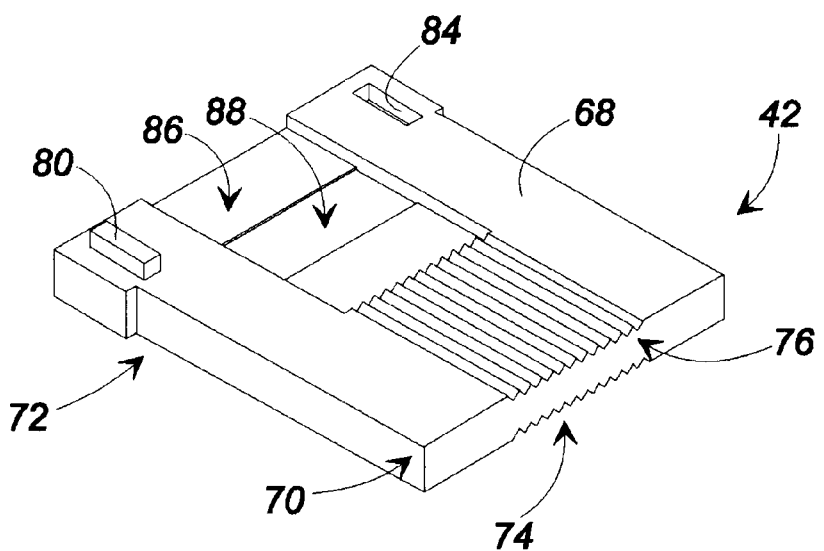
FIG. 5 is an isolated perspective view of a second surface of the inner support member of FIG. 4.

With reference to FIGS. 4 and 5, opposing surfaces 66, 68 of a representative inner support member 42 are respectively illustrated in accordance with the first embodiment. The inner support member 42 includes a front portion 70 and a rear portion 72. As best seen in FIG. 4, a first array of parallel fiber-receiving V-grooves 74 are provided in the surface 66 at the front portion 70 for receiving and holding optical fibers of an optical fiber ribbon 38 (FIG. 1). In addition, and as best seen in FIG. 5, the surface 68 of the inner support member 42 includes a second array of parallel fiber-receiving V-grooves 76 for receiving and holding optical fibers of an optical fiber ribbon 38. Thus, the inner support member 42 includes substantially identical and aligned arrays of V-grooves 74, 76 on opposite surfaces for mating with corresponding arrays of V-grooves formed in adjacent support members, and the arrays of V-grooves 74, 76 are sized like the array of V-grooves 52 (FIGS. 2 and 3A).

As seen with reference to FIGS. 4 and 5, retaining pins 78, 80 and retaining slots 82, 84 are provided on the surfaces 66, 68 at the rear portion 72 of the inner support member 42 for aligning and holding adjacent support members, as discussed above with respect to the outer support member 40 (FIGS. 1–3A). A ribbon recess 86 and a strain relief element recess 88 are provided in both surfaces 66, 68, as also discussed above with respect to the outer support member 40.

As illustrated in FIGS. 4 and 5, in accordance with the first embodiment, the inner support member 42 does not include alignment grooves 34 (FIGS. 1–3B), or the like. In addition, as illustrated in FIG. 2, the inside surfaces 44 of the outer support members 40 do not include alignment grooves 54, or the like. Accordingly, as best seen in FIGS. 2, 4, and 5, ample lateral space is available for the illustrated V-grooves 52, 74, 76, and sufficient free lateral space is available for enabling the further increase of interconnection density. In addition, because the inner support members 42 do not include alignment grooves 34, or the like, the thickness of the inner support members may be less than that of conventional support members since the inner support members do not have to be thick enough to accommodate alignment grooves, or the like. Accordingly, by reducing the thickness of the inner support members 42, a stackable multi-fiber connector can be made small enough to be received within a smaller connector housing, thereby enabling a further increase of interconnection density.

Referring to FIG. 1, the optical connector 22 may terminate any number of optical fiber ribbons 38 by utilizing two outer support members 40 and an appropriate number of inner support members 42. As only the two structural components are necessary, the overall costs of a stackable multi-fiber connector in accordance with the present invention can be less than that of comparable stackable connectors that require more than two components. This is, at least in part, because the support members can be fabricated using plastic injection molding techniques with only two molds: one for the outer support member 40 and one for the inner support member 42. This further increases the precision of the V-grooves because adjacent parts will often be formed from the same mold.

In particular, the support members 40, 42 are preferably fabricated using the techniques described in U.S. Pat. Nos. 5,388,174; 5,620,634 and 5,603,870, each of which is incorporated herein by reference. This process has been proven to consistently and reliably produce features with accuracy on the order of 1 $\mu$m or better. Generally, an example of this process is as follows. Initially, a monocrystalline body, such as a silicon chip, is anisotropically etched using conventional masking and etching techniques to produce grooves corresponding to grooves selected from the V-grooves 52, 74, 76 (FIGS. 1–4) and alignment grooves 34 (FIGS. 1–3B). For example, either KOH/water or EDP/water solutions may be used as an etchant. The etch rate of the silicon may be several orders of magnitude greater than that of the mask layer such that the unmasked portions are etched away when exposed to the etchant solution, thereby defining the grooves along the {111} crystal planes of the silicon. By precisely controlling the mask pattern and the etching process, precise grooves of predetermined spacing, widths, and depths may be fabricated in the silicon wafer.

To allow for shrinkage of the plastic during the subsequent molding process, the features on the silicon chip, such as the grooves and their spacing, should be made somewhat larger than is finally intended for the final support member. A metal layer is then electro-formed over the grooves; thereafter, the silicon body is removed or destroyed, as by etching it in, for example, a mixture of HF, $HNO_3$ and water, or KOH and water (or other known etchants of silicon) suitable for use herein. In the preferred embodiment, the metal layer is formed by electroforming nickel over the silicon wafer. Nickel is preferred because it can be conveniently electro-formed with reasonable hardness (e.g., ~50 Rockwell). The electro-formed metal layer forms an inverse replica of the silicon wafer chip which is machined for used as an insert in an injection mold for defining features of one of the support members 40, 42.

Experiments may be conducted with the injection mold to optimize molding conditions. This involves selection of the most suitable molding compound, molding parameters that produce a smooth surface morphology, and most importantly the degree of mold shrinkage. Such experiments help determine the operation parameters for the optimal output. Preferred material for forming the support members 40, 42 is polyphenylene sulfide (PPS), which has a shrinkage of ~0.4% below the dimensions of the original silicon master. Consequently, the dimensions of the silicon master should be ~0.4% greater than the final desired dimensions. For bonding the support members 40, 42 together, any of various optical adhesives can be used, such as Epo-Tek 353ND, which is commercially available from Epoxy Technologies, Inc., Billerica, Mass.

Multi-fiber connectors having some similarities to the ones described above are the subject matter of co-pending patent application Ser. No. 09/262,112, entitled "Stackable Multi-Fiber Ferrule Assembly Methods And Tools," and application Ser. No. 09/262,107, entitled "Stackable Multi-Fiber Ferrules Having Improved Interconnection Density," both filed Mar. 4, 1999, and the disclosures of which are incorporated herein by reference.

Figure 6:
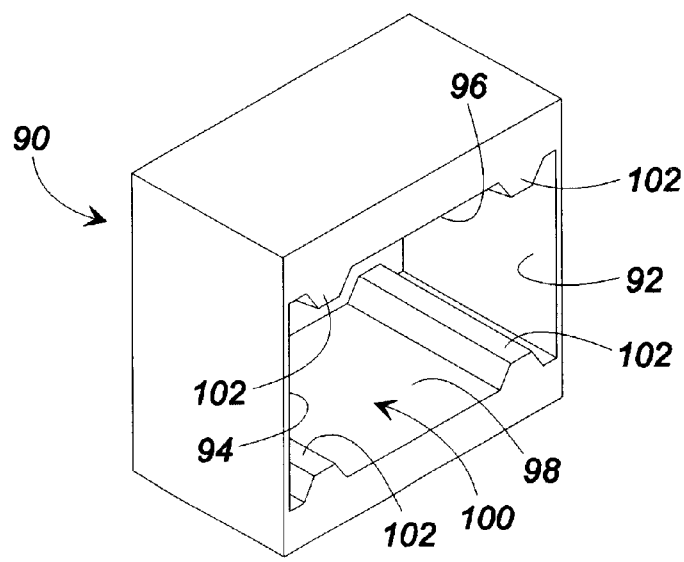
FIG. 6 is an isolated perspective view of an alignment receptacle in accordance with the first embodiment of the present invention.

FIG. 6 illustrates an alignment receptacle 90, in accordance with the first embodiment of the present invention. The alignment receptacle 90 includes opposite interior right and left sides 92, 94 that extend vertically and in a longitudinal direction. Opposite interior top and bottom sides 96, 98 extend horizontally between the right and left interior sides 92, 94 and in the longitudinal direction. The interior sides 92, 94, 96, 98 extend around and define a passage 100 that is open at the opposite ends of the alignment receptacle 90. In accordance with the first embodiment, each of the opposite openings to the passage 100 receive an optical end face 30 (FIG. 1) of a respective plug-like optical connector 22 (FIG. 1) so that those optical end faces can be readily mated together in an aligned manner, as will be discussed in greater detail below.

The alignment receptacle 90 includes a pair of upper alignment members and a pair of lower alignment members that facilitate the alignment between the two oppositely oriented end faces 30 (FIG. 1) that are introduced into the opposite openings to the passage 100. It is within the scope of the present invention for alignment members to be dowels or pins, or the like, associated with a first connector or alignment receptacle, and correspondingly shaped voids, or the like, associated with a second connector or alignment receptacle that is for mating with the first connector or alignment receptacle. More specifically, in accordance with the first embodiment, the pair of upper alignment members is a pair of alignment ridges 102 that protrude from the interior top side 96 of the alignment receptacle 90 and extend in the longitudinal direction. Likewise, the pair of lower alignment members is a pair of alignment ridges 102 that protrude from the interior bottom side 98 of the alignment receptacle 90 and extend in the longitudinal direction. In accordance with the first embodiment, the alignment ridges 102 are in the form of truncated V-shapes having heights and widths that correspond approximately to the height H1 (FIG. 3B) and width W1 (FIG. 3B) of the alignment grooves 34 (FIGS. 1–3B). The alignment ridges 102 are relatively large so that they are relatively strong, and relatively easy to manufacture and use. The alignment receptacle 90 is preferably constructed using materials and techniques similar to those described above for the support members 40, 42 (FIGS. 1–5), except that ridges are formed rather than grooves. In accordance with an alternative embodiment of the present invention, the alignment grooves 34 are more rounded, and the alignment ridges 102 define corresponding rounded shapes.

Figure 7:
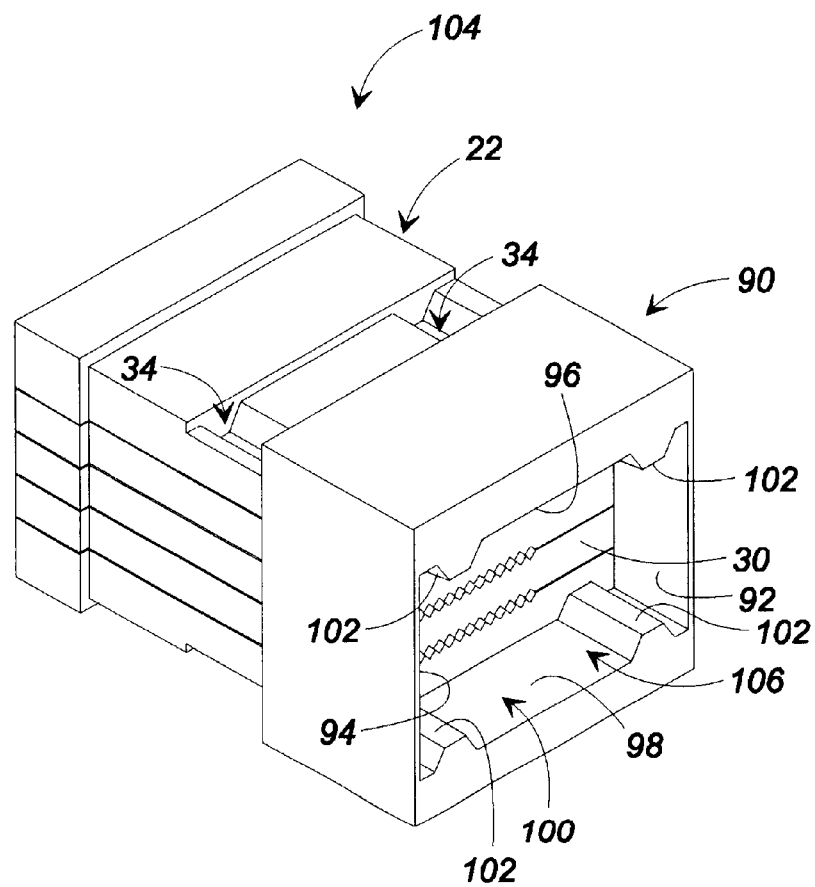
FIG. 7 is a perspective view of a receptacle-like optical connector, which is in the form of the plug-like optical connector of FIG. 1 mated to the alignment receptacle of FIG. 6, in accordance with the first embodiment of the present invention.

FIG. 7 illustrates a plug-like optical connector 22 (also see FIG. 1) mated to an alignment receptacle 90 (also see FIG. 6) in accordance with the first embodiment of the present invention. The mating is facilitated by inserting the optical end face 30 of the optical connector 22 into an open end of the passage 100 with the alignment grooves 34 of the optical connector respectively aligned with the alignment ridges 102 of the alignment receptacle 90, so that the alignment ridges are received by the alignment grooves. As illustrated in FIG. 7, the combination of the optical connector 22 and the alignment receptacle 90 can be characterized as a receptacle-like optical connector 104.

In accordance with the first embodiment, the receptacle-like optical connector 104 is arranged so that the pair of upper alignment ridges 102 extend in the longitudinal direction away from the upper edge of the optical end face 30. Further, the lower alignment ridges 102 extend in the longitudinal direction away from the bottom edge of the optical end face 30. In addition, the interior right side 92 of the alignment receptacle 90 extends in the longitudinal direction away from the right edge of the optical end face 30, the interior left side 94 of the alignment receptacle extends in the longitudinal direction away from the left edge of the optical end face, the interior top side 96 of the alignment receptacle extends in the longitudinal direction away from the top edge of the optical end face, and the interior bottom side 98 of the alignment receptacle extends in the longitudinal direction away from the bottom edge of the optical end face. Accordingly, the receptacle-like optical connector 104 can be characterized as including a receptacle cavity 106 that is defined by the optical end face 30 and the interior sides 92, 94, 96, 98.

Figure 8:
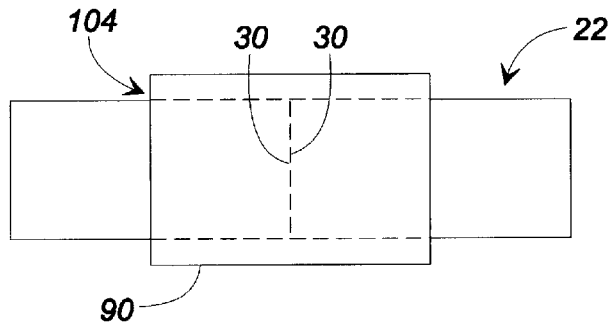
FIG. 8 is a schematic top plan view of the plug-like optical connector of FIG. 1 mated to the receptacle-like optical connector of FIG. 7, in accordance with the first embodiment of the present invention.

Referring to both FIGS. 1 and 7, in accordance with the first embodiment, the optical end face 30 of a plug-like optical connector 22 can be introduced into the receptacle cavity 106 by respectively aligning the alignment grooves 34 of the plug-like optical connector with the alignment ridges 102 that protrude into the receptacle cavity and then moving the plug-like optical connector into the cavity. This movement is contained so that the receptacle-like optical connector 104 is fully mated to a plug-like optical connector 22, so that the optical end faces 30 of those two connectors are aligned and abutting within the alignment receptacle 90 (FIGS. 6 and 7). In accordance with the first embodiment, the desired alignment and abutment between the two opposite optical end faces 30 is schematically illustrated in FIG. 8. In accordance with one embodiment of the present invention, the abutting of the optical end faces 30 is further facilitated through the use of one or more latches and a biasing member, such as a spring, that urges one of the optical end faces toward the other optical end face. For example, in accordance with one embodiment of the present invention, the referenced latching and biasing features are facilitated by incorporating an appropriately sized optical connector 22, which is more specifically a stack of multi-fiber connectors, into the connector housing disclosed in co-pending patent application Ser. No. 09/276,285, entitled "Small Form Factor Multi-Fiber Optical Connectors and Methods for Making Same," filed Mar. 25, 1999, and incorporated herein by reference.

Figure 9:
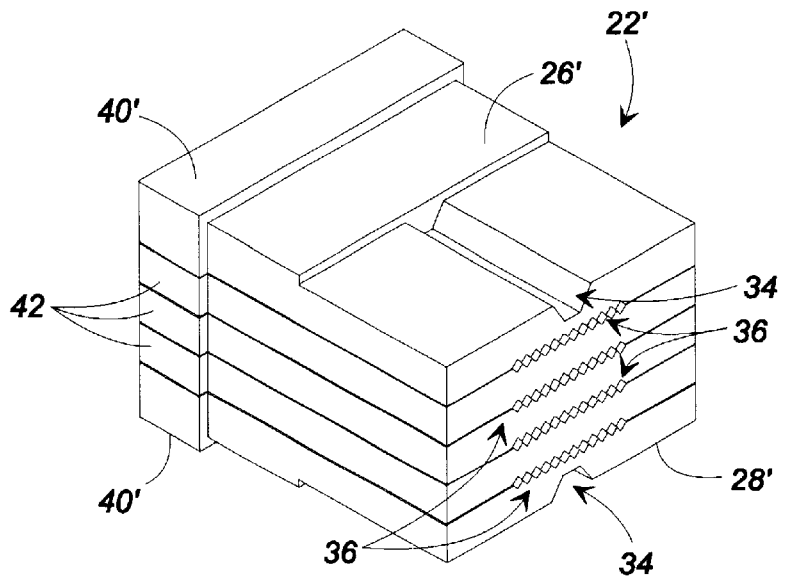
FIG. 9 is a perspective view of a plug-like optical connector, which is in the form of a stack of multi-fiber connectors, in accordance with a second embodiment of the present invention.
Figure 10:
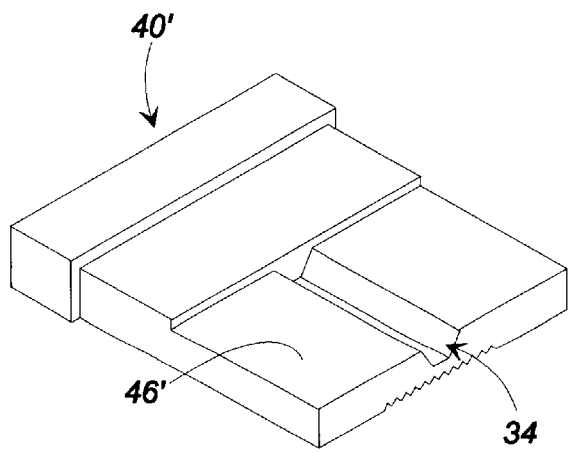
FIG. 10 is an isolated perspective view of an outside surface of an outer support member of the stack of multi-fiber connectors of FIG. 9.
Figure 11:
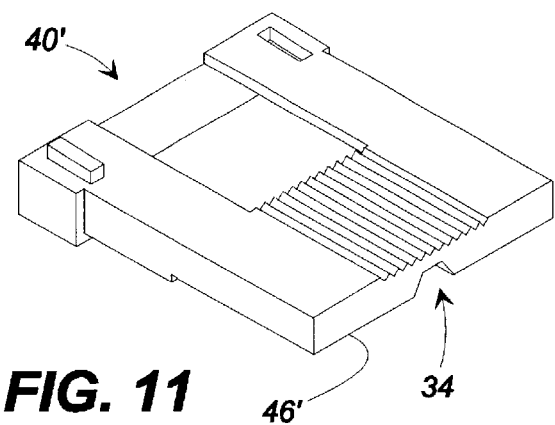
FIG. 11 is an isolated perspective view of an inside surface of the outer support member of FIG. 10.

FIG. 9 illustrates a plug-like optical connector 22' in accordance with a second embodiment of the present invention. The optical connector 22' of the second embodiment is identical to the optical connector 22 (FIG. 1) of the first embodiment except for variations noted. In accordance with the second embodiment, the top side 26' of the optical connector 22' includes a single alignment groove 34 that is centered on the top side. Similarly, the bottom side 28' of the optical connector 22' includes a single alignment groove 34 that is centered on the bottom side. More specifically, and as illustrated in FIGS. 10 and 11, each of the outer support members 40' of the optical connector 22' includes a single centered alignment groove 34 on the outside surface 46' thereof.

Figure 12:
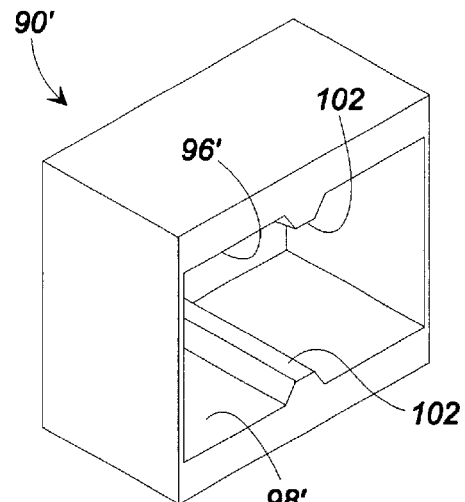
FIG. 12 is an isolated perspective view of an alignment receptacle in accordance with the second embodiment of the present invention.

FIG. 12 illustrates an alignment receptacle 90' in accordance with the second embodiment of the present invention. The alignment receptacle 90' of the second embodiment is identical to the alignment receptacle 90 (FIG. 6) of the first embodiment, except for noted variations. In accordance with the second embodiment, the alignment receptacle 90' includes a single alignment ridge 102 positioned at the interior top side 96' and centered with respect to the interior top side. Similarly, the alignment receptacle 90' includes a single alignment ridge 102 upon the interior bottom side 98' and centered with respect to the bottom side.

Figure 13:
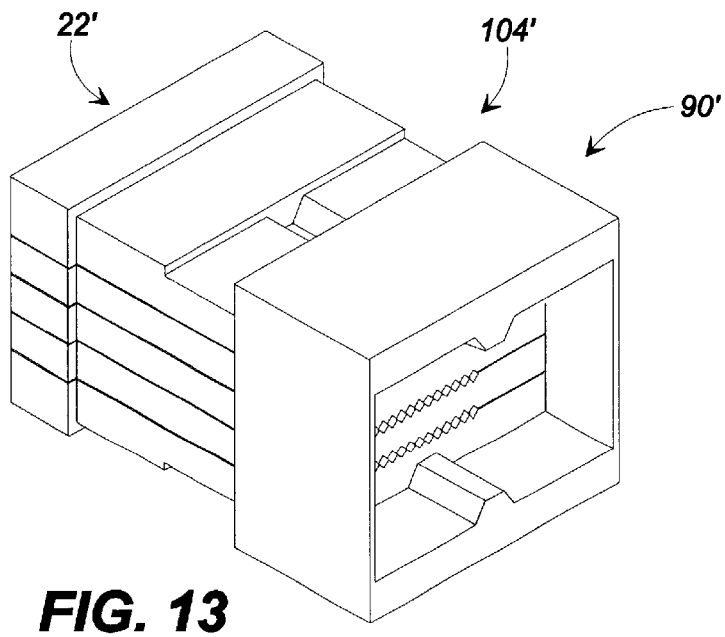
FIG. 13 is a perspective view of a receptacle-like optical connector, which is in the form of the plug-like optical connector of FIG. 9 mated to the alignment receptacle of FIG. 12, in accordance with the second embodiment of the present invention.

FIG. 13 illustrates the plug-like optical connector 22' mated to the alignment receptacle 90', in accordance with the second embodiment of the present invention. The combination illustrated in FIG. 13 can be characterized as a receptacle-like optical connector 104'.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A high-density connector for holding multiple optical fibers, the connector comprising:

a pair of outer support members, wherein each outer support member comprises opposite outer and inner sides, the inner side of each outer support member defines an array of parallel grooves for receiving some of the optical fibers, and the outer side of each outer support member defines at least one alignment groove that is substantially larger than each of the grooves of the array of parallel grooves; and an inner support member comprising opposite first and second sides, wherein the first side defines an array of parallel grooves for receiving some of the optical fibers and the second side defines an array of parallel grooves for receiving some of the optical fibers, and wherein the outer and inner support members are arranged in a stack characterized by the inner support member being positioned between the inner sides of the outer support members.

2. A connector according to claim 1, wherein the outer side of each outer support member further defines a second alignment groove, and adjacent alignment grooves are further apart than adjacent grooves of the arrays of parallel grooves.

3. A connector according to claim 1, wherein each alignment groove is in the form of a truncated V-shape.

4. A connector according to claim 1, wherein the alignment grooves are parallel to the parallel grooves.

5. A connector according to claim 1, further comprising a plurality of inner support members, wherein each inner support member comprises opposite first and second sides, for each inner support member the first side thereof defines an array of parallel grooves for receiving some of the optical fibers and the second side defines an array of parallel grooves for receiving some of the optical fibers, and the inner and outer support members are arranged in a stack characterized by the inner support members being positioned between the inner sides of the outer support members.

6. A high-density optical connector, comprising:

a body comprising a rear end and a generally rectangular end face that is opposite from and forward of the rear end, wherein a longitudinal direction is defined between the rear end and the end face, the end face extends generally perpendicular to the longitudinal direction, and the end face comprises:

opposite first and second edges, and opposite third and fourth edges that extend between the first and second edges in a lateral direction;

an alignment member proximate to the third edge and extending in the longitudinal direction; and a plurality of arrays of optical terminuses, wherein each array is positioned at the end face and extends in the lateral direction across the end face, and the alignment member is substantially larger than each optical terminus of the arrays of optical terminuses.

7. An optical connector according to claim 6, wherein in each array a distance is defined between adjacent optical terminuses that is less than a distance defined between adjacent arrays.

8. An optical connector according to claim 6, wherein the body comprises a stack of multi-fiber connectors and the optical connector further comprises a plurality of optical fiber ribbons that are held by the stack of multi-fiber connectors, wherein each optical fiber ribbon comprises a plurality of longitudinally extending optical fibers bonded together as a unit, and for each array the optical terminuses thereof are terminuses of the optical fibers of a respective optical fiber ribbon.

9. An optical connector according to claim 6, wherein the alignment member extends rearward from proximate to the third edge.

10. An optical connector according to claim 9, wherein the alignment member comprises an alignment surface that defines an alignment groove that extends in the longitudinal direction.

11. An optical connector according to claim 10, further comprising a second alignment surface that defines a second alignment groove that is proximate to the fourth edge and extends in the longitudinal direction.

12. An optical connector according to claim 6, wherein the alignment member extends forward from proximate to the third edge.

13. An optical connector according to claim 12, wherein the alignment member comprises an alignment ridge.

14. An optical connector according to claim 13, further comprising a second alignment ridge that is proximate to the fourth edge and extends in the longitudinal direction.

15. A high-density plug-like optical connector for being inserted into a cavity defined by the interior of a receptacle, the optical connector comprising:
a generally-rectangular body comprising a rear end and an end face that is opposite from and forward of the rear end, wherein a longitudinal direction is defined between the rear end and the end face, the end face extends generally perpendicular to the longitudinal direction, and the body further comprises:
opposite first and second sides that extend rearward from the end face and in the longitudinal direction,
opposite third and fourth sides that extend rearward from the end face, in the longitudinal direction, and laterally between the first and second sides,
a first alignment member proximate to the third side, extending in the longitudinal direction, and extending rearward from proximate to the end face, wherein the first alignment member is in opposing face-to-face relation with the interior of the receptacle while the connector is within the cavity of the receptacle, and
a second alignment member proximate to the fourth side, extending in the longitudinal direction, and extending rearward from proximate to the end face, wherein the second alignment member is in opposing face-to-face relation with the interior of the receptacle while the connector is within the cavity of the receptacle; and
a plurality of arrays of optical terminuses, wherein each array is positioned at the end face and extends laterally across the end face, and each of the alignment members is substantially larger than each optical terminus of the arrays of optical terminuses.

16. An optical connector according to claim 15, wherein in each array a distance is defined between adjacent optical terminuses that is less than a distance defined between adjacent arrays.

17. An optical connector according to claim 15, wherein:
the first alignment member comprises a first alignment surface that is positioned on the third side of the body and defines a first alignment groove that extends in the longitudinal direction; and
the second alignment member comprises a second alignment surface that is positioned on the fourth side of the body and defines a second alignment groove that extends in the longitudinal direction.

18. An optical connector according to claim 17, wherein:
the first alignment groove is open at the end face and is also open at the third side; and
the second alignment groove is open at the end face and is also open at the fourth side.

19. An optical connector according to claim 15, wherein the body comprises a stack of multi-fiber connectors.

20. An optical connector according to claim 19, further comprising a plurality of optical fiber ribbons that are held by the stack of multi-fiber connectors, wherein each optical fiber ribbon comprises an array of longitudinally extending optical fibers bonded together as a unit, and the optical terminuses of the arrays are terminuses of the optical fibers of the optical fiber ribbons.

21. A high-density receptacle-like optical connector, comprising:
a body comprising a rear end and an end face that is opposite from and forward of the rear end, wherein a longitudinal direction is defined between the rear and the end face, the end face extends generally perpendicular to the longitudinal direction, and the end face comprises:
opposite first and second edges, and
opposite third and fourth edges that extend laterally between the first and second edges;
a first alignment member extending in the longitudinal direction and forward from proximate to the third edge of the end face; and
a second alignment member extending in the longitudinal direction and forward from proximate to the fourth edge of the end face; and
a plurality of arrays of optical terminuses, wherein each array is positioned at the end face and extends laterally across the end face, and each of the alignment members is substantially larger than each optical terminus of the arrays of optical terminuses.

22. An optical connector according to claim 21, wherein in each array a distance is defined between adjacent optical terminuses that is less than a distance defined between adjacent arrays.

23. An optical connector according to claim 21, wherein the body defines a cavity that is at least partially defined by and forward of the face, and the body further comprises opposite interior first and second sides that extend in the longitudinal direction and forward from proximate to the third and fourth edges, respectively, wherein the interior first and second sides at least partially define the cavity and an opening to the cavity.

24. An optical connector according to claim 23, wherein:
the first alignment member is a first alignment ridge that extends into the cavity from the interior first side; and
the second alignment member is a second alignment ridge that extends into the cavity from the interior second side.

25. An optical connector according to claim 21, wherein the body comprises a stack of multi-fiber connectors.

26. An optical connector according to claim 25, further comprising a plurality of optical fiber ribbons that are held by the stack of multi-fiber connectors, wherein each optical fiber ribbon comprises an array of longitudinally extending optical fibers bonded together as a unit and the optical terminuses of the arrays are terminuses of the optical fibers of the optical fiber ribbons.

27. A connector according to claim 1, wherein the outer side of each outer support member is an exterior surface of the connector.

28. A connector according to claim 1, wherein for each of the outer support members:
the array of parallel grooves of the outer support member extends in a plane that is substantially parallel to outer side of the outer support member, and
the alignment groove of the outer support member is not intersected by said plane in which the array of parallel grooves of the outer support member extend.

29. A connector according to claim 1, wherein each outer support member includes opposite edges that extend between the outer and inner sides of the outer support member, and for each outer support member:

the minimum distance between the array of parallel grooves and a first edge of said edges of the outer support member is less than the minimum distance between the alignment member and the first edge, and the minimum distance between the array of parallel grooves and a second edge of said edges of the outer support member is less than the minimum distance between the alignment member and the second edge.

30. A connector according to claim 1, wherein for each of the outer support members, the outer side does not include any grooves that are both for receiving optical fibers and substantially smaller than the alignment groove of the outer support member.

31. An optical connector according to claim 6, wherein the alignment member includes an exterior surface of the optical connector.

32. An optical connector according to claim 6, wherein for each array, the array extends in a plane that is substantially parallel the third edge and the longitudinal direction, and said plane does not intersect the alignment member.

33. An optical connector according to claim 32, wherein for each array:

the minimum distance between the array and the first edge is less than the minim distance between the alignment member and the first edge, and the minimum distance between the array and the second edge is less than the minim distance between the alignment member and the second edge.

34. An optical connector according to claim 15, wherein for each array, the array extends in a plane that is substantially parallel the third and fourth sides of the body, and said plane does not intersect either of the first and second alignment members.

35. A high-density connector for holding multiple optical fibers and being inserted into a cavity defined by interior surfaces of a receptacle, the connector comprising:

a pair of outer support members, wherein each outer support member comprises opposite outer and inner sides, the inner side of each outer support member defines an array of parallel grooves for receiving some of the optical fibers, and the outer side of each outer support member defines at least one alignment groove that is substantially larger than each of the grooves of the array of parallel grooves; and an inner support member comprising opposite first and second sides, wherein the first side defines an array of parallel grooves for receiving some of the optical fibers and the second side defines an array of parallel grooves for receiving some of the optical fibers, and wherein the outer and inner support members are arranged in a stack characterized by the inner support member being positioned between the inner sides of the outer support members, the outer side of each outer support member is an exterior surface of the stack, and the outer sides of the outer support members are respectively in opposing face-to-face relation with the interior surfaces of the receptacle while the connector is within the cavity of the receptacle.

36. A connector according to claim 35, wherein each outer support member includes opposite edges that extend between the outer and inner sides of the outer support member, and for each outer support member:

the minimum distance between the array of parallel grooves and a first edge of said edges of the outer support member is less than the minimum distance between the alignment member and the first edge, and the minimum distance between the array of parallel grooves and a second edge of said edges of the outer support member is less than the minimum distance between the alignment member and the second edge.

37. A connector according to claim 35, wherein for each of the outer support members:

the array of parallel grooves of the outer support member extends in a plane that is substantially parallel to outer side of the outer support member, and the alignment groove of the outer support member is not intersected by said plane in which the array of parallel grooves of the outer support member extend.

* * * * *